United States Patent
Bieber et al.

(10) Patent No.: US 6,276,487 B1
(45) Date of Patent: Aug. 21, 2001

(54) ROTARY SLIDE VALVE FOR POWER ASSISTED STEERING OF MOTOR VEHICLES

(75) Inventors: Jürgen Bieber, Schwäbisch Gmünd; Werner Breitweg, Bargau; Rainer Schänzel, Essingen, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/530,112

(22) PCT Filed: Oct. 23, 1998

(86) PCT No.: PCT/EP98/06735

§ 371 Date: Apr. 25, 2000

§ 102(e) Date: Apr. 25, 2000

(87) PCT Pub. No.: WO99/21746

PCT Pub. Date: May 6, 1999

(30) Foreign Application Priority Data

Oct. 29, 1997 (DE) ............................................. 197 47 639

(51) Int. Cl.$^7$ ...................................................... F15B 9/10
(52) U.S. Cl. .......................... 180/426; 180/403; 180/429; 91/375 A
(58) Field of Search .................................. 180/400, 403, 180/417, 426, 427, 429, 441, 430; 91/375 A, 375 R

(56) References Cited

U.S. PATENT DOCUMENTS

| | | | |
|---|---|---|---|
| 4,877,100 | * 10/1989 | Emori et al. | .................. 91/375 A X |
| 5,046,574 | * 9/1991 | Goodrich, Jr. et al. | ....... 91/375 A X |
| 5,571,238 | 11/1996 | Breitweg et al. | . |
| 5,575,193 | * 11/1996 | Bareis et al. | ........................ 91/375 A |
| 5,769,121 | * 6/1998 | Breitweg | .......................... 91/375 A X |
| 5,797,309 | 8/1998 | Eberhart . | |

FOREIGN PATENT DOCUMENTS

| | | |
|---|---|---|
| 42 34 571 A1 | 4/1994 | (DE) . |
| 19633633-A1 | * 2/1998 | (DE) . |
| 0 159 687 | 10/1985 | (EP) . |

* cited by examiner

Primary Examiner—J. J. Swann
Assistant Examiner—F. Zeender
(74) Attorney, Agent, or Firm—Larson & Taylor PLC

(57) ABSTRACT

A rotary shift or slide valve (1) for power steering systems of motor vehicles contains a rotary slide (4) linked to a valve input element (23). A control bush (7) is guided in an axial bore (6) of the rotary slide (4) and rotatable by a limited angle. The control bush (7) forms a rotation-fixed link with a valve output element (18). Between the rotary slide (4) and the valve output element (18), there is a centering device, which contains two centering elements (32, 33), which can be rotated against each other, and at least one anti-friction element (36) located between the two centering elements (32, 33). One of the centering elements (33) forms a fixed link with the reaction piston (37) and a rotation-fixed but axially displaceable link with the valve output element (18) via a metal bellows (38). The other centering element (32) forms a rotation-fixed and non-displaceable link with the rotary slide (4). The reaction piston (37) in the area of the centering device is arranged radially around the rotary slide (4) and projects in axial direction into the area of the rotary slide (4). As a result of this intra-positioning of components, the axial length of the rotary shift valve is reduced.

10 Claims, 2 Drawing Sheets

ROTARY SLIDE VALVE FOR POWER ASSISTED STEERING OF MOTOR VEHICLES

FIELD OF THE INVENTION

The invention refers to a rotary or slide valve for power steering systems of motor vehicles. The rotary shift valve contains two valve elements, which are coaxially flexibly arranged, with maximum rotation relative to each other being limited by the rotational travel of a backlash clutch. The first valve element, which is linked to a valve input element, is designed as a radial, outer rotary slide. The second valve element forms a rotation-fixed link with a valve output element and is designed as a radial, inner control bush, which is guided in an axial bore of the rotary slide. Both valve elements feature longitudinal control grooves whose axial length is at least partially limited and which cooperate in the control of the flow of a pressure medium to and from two working spaces of a servomotor. A torsion rod spring returns the two valve elements from their deflected positions to their neutral positions.

BACKGROUND OF THE INVENTION

A centering device is arranged between the rotary slide and the valve output element in support of the torsion rod spring. This device contains two centering elements, which are rotatable against each other, and there is at least one anti-friction element located between the two centering elements. One of the centering elements forms a rotation-fixed link with a reaction piston.

Such a rotary shift or slide valve is known from DE-A1-44 33 599. The advantage of this rotary shift valve is that the outer dimensions of the entire valve can be very small, which is due to the particular arrangement of the control bush inside the rotary slide. With this rotary shift valve, centering is effected via the torsion rod spring. The particular feature of a torsion rod spring is that the return effected by the torsion rod spring in the actual center area of the rotary shift valve is only minimal. Therefore, the torsion rod spring is supplemented by a centering device, which allows precise centering, especially in the center area of the rotary shift valve. In this version, extra space in axial direction is required for the additional centering device, and especially for longitudinal guidance of one of the centering elements.

Since the centering device is arranged between the rotary slide and the valve output element, it is possible for a prefixed position to be determined for one centering element of the centering device together with the valve output element. As a result, it is possible to set centering force and position of the centering device after production of the individual parts. Since the reaction piston rotates together with the rotary slide, a relative motion results between the reaction piston and a valve housing. The reaction piston must be sealed off against the valve housing, and therefore friction arises, which directly affects the manual force to be applied to a hand wheel.

BRIEF SUMMARY OF THE INVENTION

The task of the invention is to improve the known rotary shift valve in such a way that friction is reduced. At the same time, the length of the rotary shift valve is to be shortened.

This task is solved by the rotary shift valve described in hereinbelow. Beneficial and purposeful features of the invention are also described hereinbelow.

The solution in the generic rotary shift valve is brought about by a rotation-fixed but axially displaceable link between the valve output element and the centering element, which is firmly linked to the reaction piston. The other centering element is in a predetermined position and forms a rotation-fixed and non-displaceable link with the rotary slide. The reaction piston in the area of the centering unit is deposed radially around the rotary slide and projects in axial direction into the area of the rotary slide.

In the invented arrangement, the reaction piston forms a rotation-fixed but axially displaceable link with the valve output element. As a result, sealing ring friction between reaction piston and valve housing is transferred from the primary side to the secondary side of the rotary shift valve. Backlash-free reaction torque can be generated, which results in precise function. With regard to the return of the rotary shift valve to its neutral position, no extra hysteresis is generated by the friction on the sealing ring of the reaction piston. By intra-positioning reaction piston and rotary slide, i.e. as a result of the reaction piston projecting into the area of the slide valve, a compact and short design is achieved.

The axial dimensions of the rotary shift valve are further reduced if the rotation-fixed link between the reaction piston and the valve output element is formed by a metal bellows. The latter is installed radially outside the centering elements so that here, too, intra-positioning cuts back axial length.

The purpose of the metal bellows is mainly to bring about torsion rigidity of the reaction piston in relation to the valve output element. By means of additional pre-load of the metal bellows, through which the metal bellows also acts as a spring, the valve characteristics can be directly influenced.

Torsion rigidity of the reaction piston is particularly easy to bring about if metal bellows and reaction piston are firmly linked to each other. Then, following adjustment of the centering device, the metal bellows only needs to be firmly linked to the valve output element by form- or friction-locking means.

If in the process of assembly of rotary shift valve and centering device, linking of the metal bellows to the valve output element is to be omitted, a bush can be affixed to the metal bellows, with this bush having an adhesive or friction lining, which in cooperation with an adhesive or friction lining on a surface of the reaction piston brings about a rotation-fixed friction and/or adhesive link, due to the pre-load of the metal bellows and/or the hardening of the adhesive. Then, there is no need for the metal bellows to be mounted stationary.

BRIEF DESCRIPTION OF THE DRAWINGS

A detailed description of the invention on the basis of two embodiments shown in the drawings follows.

DETAILED DESCRIPTION OF THE INVENTION

Figure 1:
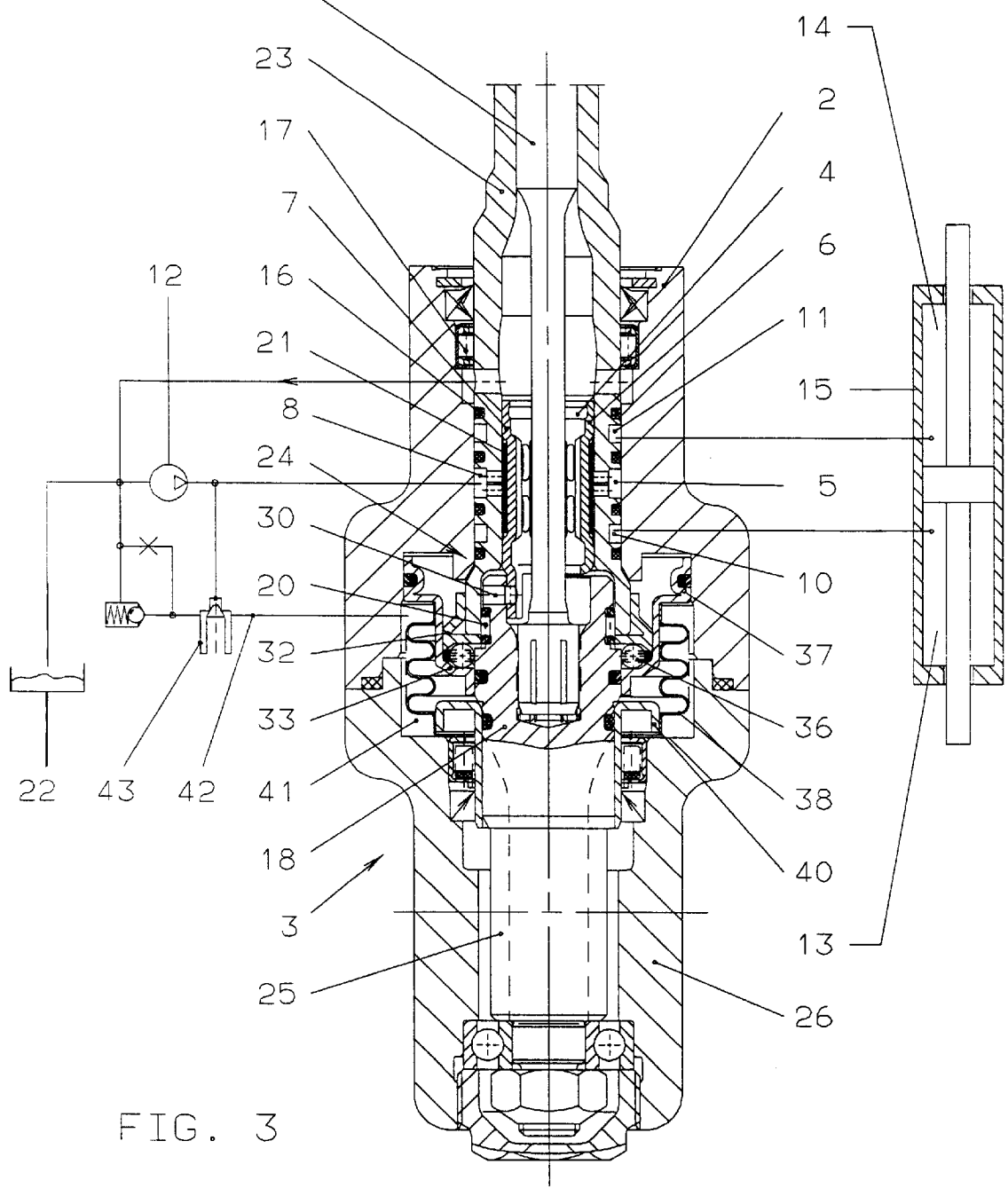
FIGS. 1 & 2: Each shows a longitudinal section of the invented rotary shift valve with a schematically shown, pertinent steering gear in the two embodiments.
Figure 3:
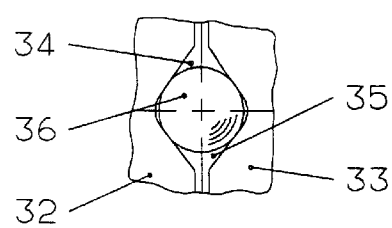
FIG. 3 : Shows an enlarged partial view of the centering device depicted in FIG. 1.

A rotary shift or slide valve depicted in FIG. 1 is contained in a valve housing 2 of a power steering gear 3.

The rotary shift valve of FIG. 1 contains a first valve element in the form of a rotary slide 4, which is rotatably guided in a valve bore 5 of the valve housing 2. The rotary slide 4 features an axial bore 6, in which a second valve element in the form of a control bush 7 is rotatably guided. The rotary slide 4 is located radially outside, while the control bush 7 is located radially inside.

On its outer shell surface, the rotary slide 4 features annular grooves 8, 10, 11, with which a servo pump 12 and/or two working spaces 13 and 14 of a servomotor 15 communicate. The annular grooves 8, 10, 11 are sealed off against the valve bore 5 by means of sealing rings 16. The rotary slide 4 in the valve housing 2 is supported by an anti-friction bearing 17, and on a valve output element 18 by an anti-friction bearing 20. In its axial bore 6, the rotary slide 4 has longitudinal control grooves (not represented), whose axial length is limited and which communicate with longitudinal control grooves 21 arranged on the outer shell surface of the control bush 7. Some of the longitudinal control grooves 21 are closed on both ends of the control bush 7. Some of the longitudinal control grooves 21 are open on one end of the control bush 7 and communicate with a pressure medium reservoir 22, from which the servo pump 12 sucks the pressure medium.

The rotary slide 4 forms a rotation-fixed link with a valve input element 23, which is designed as steering spindle connector. The steering spindle connector is, for example, linked to a steering spindle (not represented) via a cross joint (also not represented). In addition, the rotary slide 4 forms a link with the valve output element 18 via a backlash clutch 14 (not described in detail). The backlash clutch 24 consists, for example, of internal teeth on the rotary slide 4 and external teeth on the valve output element 18. The valve output element 18 is simultaneously an input element for the mechanical part of the power steering system 3 and is linked to a pinion 25, for example. The pinion 25 is rotatably supported in a steering housing 26 and cooperates with a tooth rack (not represented), which is guided in the steering housing 26 and is axially displaceable. In addition, the rotary slide 4 forms a link with the valve output element 18 via a torsion rod spring 28. The valve output element 18, via a pin 30, forms a rotation-fixed link with the control bush 7, one end of which extends into an axial bore of the valve output element 18.

These various links permit limited rotation between the rotary slide 4 and the control bush 7. As a result of the rotation between the two valve elements, the pressure medium transported by the servo pump 12 is fed to the respective working space 13 or 14 of the servomotor 15, and returned from the respective working space 14 or 13 to the pressure medium reservoir 22.

Figure 2:
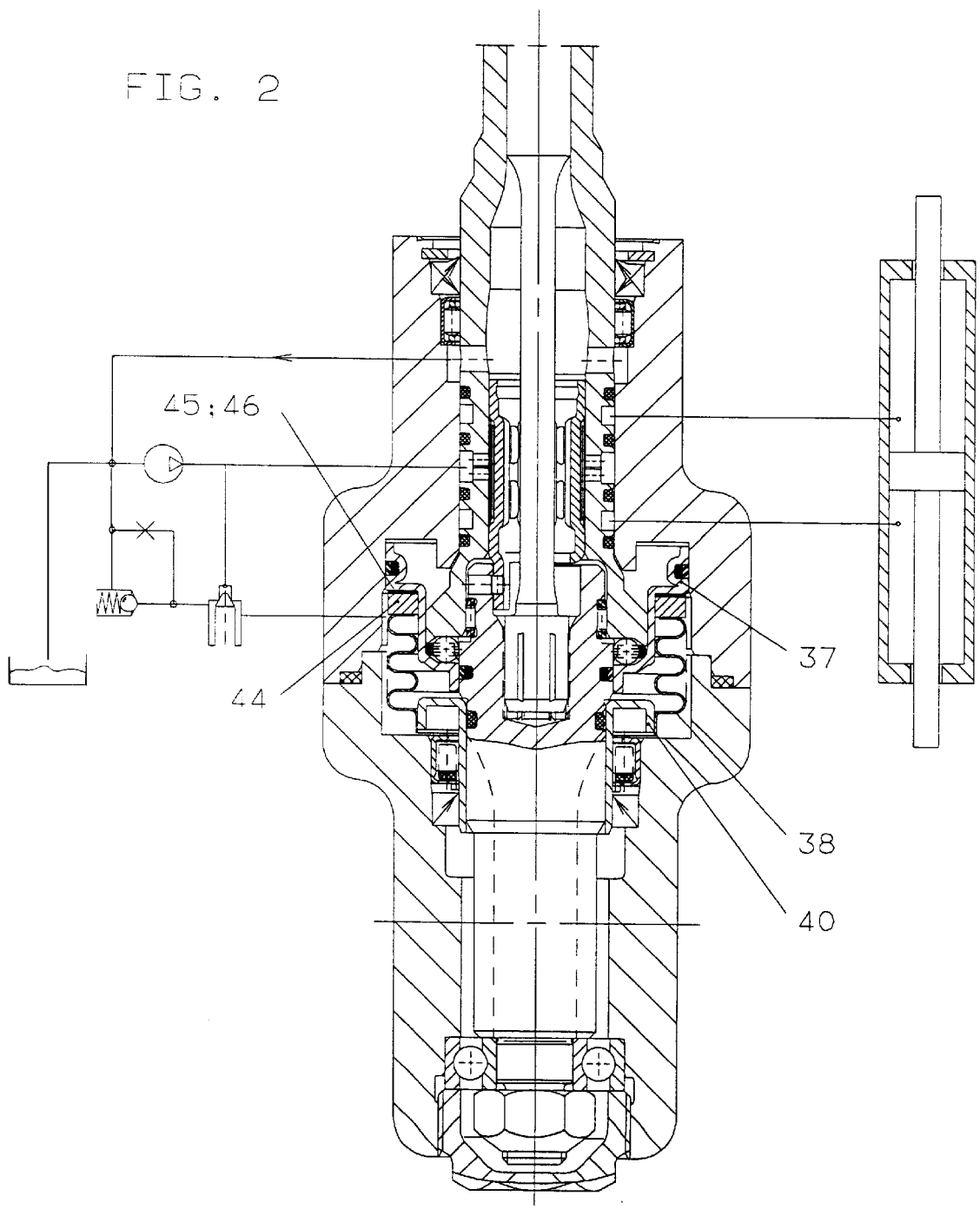

Between rotary slide 4 and valve output element 18, there is a centering device, which contains two centering elements 32 and 33, which are rotatable against each other. On each of the faces of the two centering elements 32 and 33 of the centering device facing each other, there is at least one V-shaped recess 34 or 35. Instead of V-shaped, the recesses 34 and 35 can, for example, also be U-shaped. Between the two recesses 34 and 35 there is an anti-friction element 36, for example, a ball, which is contained in a plastic cage. One of the centering elements 32 is firmly linked to the rotary slide 4 (FIG. 1) or forms a single unit with it (FIG. 2). The other centering element 33 forms a fixed link with a reaction piston 37. The reaction piston 37 with its centering element 33 forms a rotation-fixed but axially displaceable link with the valve output clement 18. This link is established by a metal bellows 38, which forms a firm link with the reaction piston 37 on the one hand and directly or, for example, via a bush 40, with the valve output element 18 on the other hand. The reaction piston 37 in the area of the centering device is arranged radially a round the rotary slide 4 and projects in axial direction into the area of the rotary slide 4. In this manner, the reaction piston 37 requires hardly any additional axial space.

The reaction piston 37 is sealingly guided on the valve output element 18 and in the valve housing 2. In this way, a reaction space 41 is created, which can be fed with a steering force-dependent servo pressure via a line 42. In the familiar manner, the servo pressure can be influenced by an electro-hydraulic converter 43 in relation to road speed or other parameters. The reaction space may, as shown in the embodiments of FIG. 1 and 2, contain the metal bellows 38; or it may be a space opposite to the metal bellows 38 in relation to the reaction piston 37. In the latter case, the reaction pressure will counteract the force of the metal bellows 38. The metal bellows 38 is under relatively strong pre-load, which is relieved through the reaction pressure The main purpose of the metal bellows 38 is to bring about a torsionally rigid link between the centering element 33 and the valve output element 18. If, however, the valve characteristics are to be influenced, the metal bellows 38 can be pre-loaded. This pre-load imparts spring properties to the metal bellows 38. To influence or calibrate the valve characteristics, the spring pre-load of the metal bellows 38 can be varied. Rigidity adjustment of the rotary shift valve is possible via the geometry of the metal bellows 38, for example, via bellows form and wall thickness.

The rotary shift valve together with the centering device is assembled and adjusted as follows: The two valve elements, rotary slide 4 and control bush 7, are arranged relative to each other in a defined position corresponding to the hydraulic center, and are fixed there by forming a link between the two valve elements by means of the torsion rod spring 28. One of the centering elements 32 forms a firm link with the rotary slide 4, through which the position of one of the centering elements 32 is determined in relation to the hydraulic center of the rotary slide valve. The second centering element 33, which forms a single part with the reaction piston 37, is loosely located on the bush 40, together with the metal bellows 38 pre-fixed on the reaction piston 37. The rotation-fixed and axially non-displaceable bush 40 is arranged on the valve output element 18. Now the reaction piston 37 is moved relative to the centering element 32, together with its centering element 33 and the metal bellows 38. As soon as the two centering elements 32 and 33 are positioned relative to each other via the anti-friction elements 36, the metal bellows 38 is affixed to the bush 30, if necessary, with a predetermined pre-load.

The embodiment according to FIG. 2 largely corresponds to the embodiment according to FIG. 1. The only differences are found in the area of the metal bellows 38. In the embodiment according to FIG. 2, the metal bellows 38 are not firmly linked to the reaction piston 37. On the metal bellows 38, a bush 44 is affixed, which has a friction lining 45. One of the surfaces of the reaction piston 37 facing the bush 44 also has a friction lining 46. After assembly of the metal bellows 38, the two friction linings 45 and 46 form a friction connection. Adhesive linings may be used instead of friction linings. The adhesive chosen has to be one that does not immediately harden, because then exact positioning of the individual parts will be brought about automatically before hardening sets in. The advantage of this arrangement is that the metal bellows 38 with the bush 40 need not be mounted stationary.

What is claimed is:

1. A rotary slide valve for a power steering system of a motor vehicle, comprising:
    a first valve element which is fixed with an input element of the steering system, said first valve element including a radial outer rotary slide having an axial bore;
    a second valve element which is rotation fixed with an output element of the steering system, said second valve element including a radial inside control bush guided in the axial bore of said rotary slide;

a torsion rod spring and a backlash clutch which connect the first valve element to the output element;

a valve housing in which said first and second valve elements are coaxially flexibly arranged, with a maximum rotation of said valve elements relative to each other being limited by a rotation travel of said backlash clutch;

inner longitudinal control grooves on said rotary slide and outer longitudinal control grooves on said control bush, said control grooves having axial lengths which are at least partially limited and which are adapted to cooperate in a flow of a pressure medium of a servo motor of the steering system flowing back and forth between two working spaces of the servomotor;

a reaction piston disposed radially around said rotary slide and projecting in an axial direction beyond said radial slide towards the output element, said reaction piston forming a rotation-fixed but axially displaceable link with the output element; and a centering device located between said rotary slide and said valve output element, said centering device including a) two oppositely rotatable centering elements,
  i) a first one said centering elements forming a rotation-fixed and non-displaceable link with said rotary slide in a predetermined position, and
  ii) a second one of said centering elements being fixed with said reaction piston,
b) a recess in each centering element, and
c) at least one anti-friction element located between the two centering elements and supported in the recesses thereof.

2. A rotary slide valve as claimed in claim 1, wherein the rotation-fixed but axially displaceable link between said reaction piston and the output element is a metal bellows.

3. A rotary slide valve as claimed in claim 2, wherein said metal bellows provides torsion rigidity between said reaction piston and the output element.

4. A rotary slide valve as claimed in claim 3, wherein said metal bellows also provides a spring action so that relative axial movement between the first and second ones of said centering elements is possible.

5. A rotary slide valve as claimed in claim 2, wherein said reaction piston and said metal bellows are connected together.

6. A rotary slide valve as claimed in claim 2, wherein said reaction piston and said metal bellows are connected together via a bush affixed to said metal bellows.

7. A rotary slide valve as claimed in claim 6, wherein said reaction piston and said metal bellows have facing surfaces, and said facing surfaces are provided with a lining allowing movement therebetween.

8. A rotary slide valve as claimed in claim 1, wherein the first one of said centering elements is integrally formed with said rotary slide.

9. A rotary slide valve as claimed in claim 1, wherein said recesses of said centering elements are one of V-shaped or U-shaped.

10. A rotary slide valve as claimed in claim 4, wherein the spring action of said metal bellows is adjustable.

* * * * *